April 10, 1962 R. A. HILL 3,029,370
ELECTROLYTIC CAPACITORS

Filed Aug. 4, 1958 2 Sheets-Sheet 2

INVENTOR.
RONALD A. HILL
BY
ATTORNEY

United States Patent Office 3,029,370
Patented Apr. 10, 1962

3,029,370
ELECTROLYTIC CAPACITORS
Ronald Alfred Hill, London, England, assignor to International Standard Electric Corporation, New York, N.Y., a corporation of Delaware
Filed Aug. 4, 1958, Ser. No. 752,772
Claims priority, application Great Britain Aug. 9, 1957
4 Claims. (Cl. 317—230)

This invention relates to capacitors of the type in which the electrodes are separated by a dry electrically conducting material, and a layer of dielectric material is arranged between at least one of the electrodes and the conducting material.

Capacitors of this type have been called solid capacitors to distinguish them from capacitors where the conducting material is a liquid electrolyte.

A solid capacitor which comprises one electrode formed by a porous body of an anodizable metal upon the surfaces of which a dielectric film is produced by anodization, a layer of semi-conductive oxide on the dielectric film, and a metal layer as the other electrode on the semi-conductive oxide, is described and claimed in British Patent 747,051. The material suggested for the semi-conductive oxide is manganese dioxide.

One purpose of the conducting oxide in contact with the dielectric film is to supply oxygen to the latter and maintain it in as uniform an insulating state as possible. It can, therefore, take the place of the liquid electrolytes which supply oxygen to the film by elecrolytic action.

A disadvantage of the use of a solid oxide such as manganese dioxide is that its electrical conductivity is only moderate. The resulting capacitors have, therefore, quite a significant power factor, resulting in heat losses particularly at the higher frequencies. The use of more highly conducting oxides is possible, but the disadvantages of these is that their ability to supply oxygen is small so that their film healing properties are poor.

I have discovered that it is possible to combine the properties of high conductivity and good film healing by the use of a mixture of appropriate oxides.

The quantities of oxide mentioned in this specification are percentages by weight of the mixture. An oxide which confers high conductivity but which is not in itself film healing is thallic oxide. The conductivity of a mixture of 5% thallic oxide and 95% natural manganese dioxide is ten times greater than that of the natural manganese dioxide alone. The conductivity of a mixture of 15% thallic oxide and 85% natural manganese dioxide is more than one hundred times that of the natural manganese dioxide. At the same time the film healing properties of the mixture are almost the same as that of the natural manganese dioxide alone.

Figure 1:
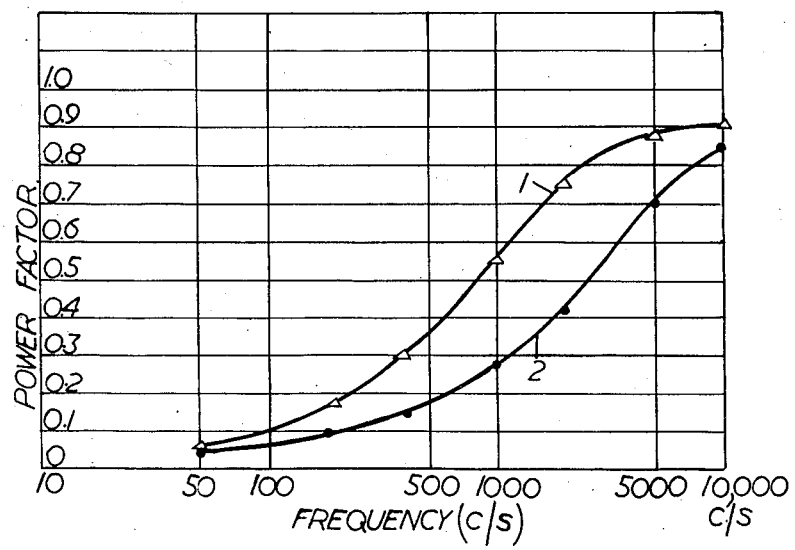
Figure 2:
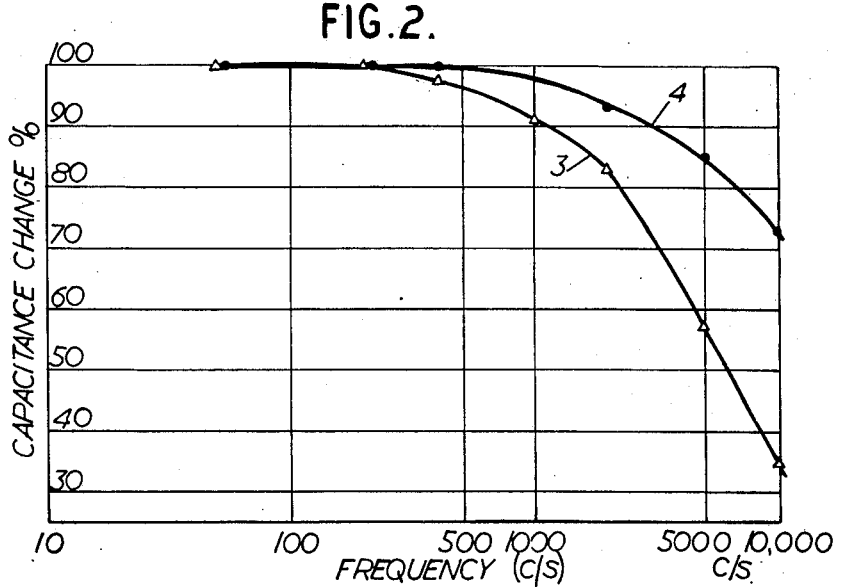
Figure 3A:
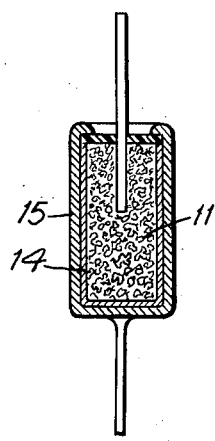
Figure 3B:
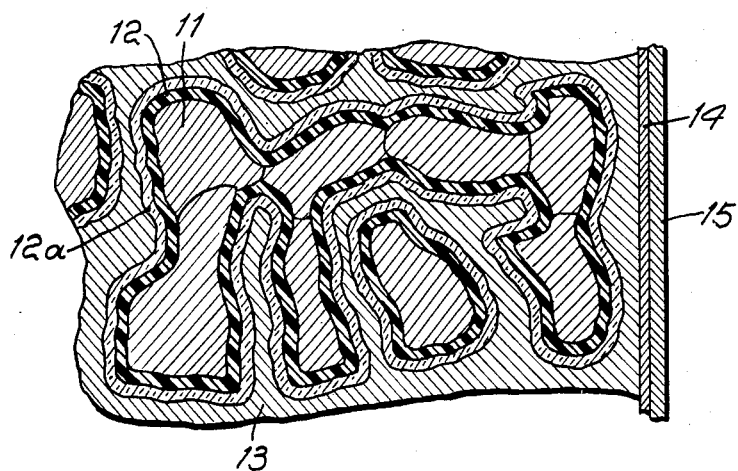

An embodiment of the invention has been illustrated in the accompanying drawings as applied to a capacitor which has a sintered porous tantalum body as an anode, the advantages of the arrangement being illustrated in FIG. 1 which is a graph of power factor plotted against frequency and in FIG. 2 which is a graph of percentage capacitance change plotted against frequency, while FIG. 3A is a sectional elevation of the capacitor and FIG. 3B is an enlarged fragmentary sectional view of the tantalum body.

The interior surfaces of the sintered porous tantalum body 11 are first provided with a dielectric film 12 of tantalum oxide by anodisation in a solution of 60% sulphuric acid at 140° C. against a cathode of platinum at a potential of 18 v. This is to provide a capacitor with a working voltage of 8 v. Anodization is continued until the current has dropped to approximately 200 microamperes. This current is typical for cylindrical anodes of dimensions up to 7 mm. long and 3 mm. diameter.

The anode is then removed and thoroughly washed. It is then immersed in a solution of manganese nitrate of specific gravity 1.5, and containing thallous nitrate in concentration of 4.76 g. per litre, until it is completely saturated with the solution, and then heated to 450° C. for fifteen minutes in air to decompose the salts and form an intimate mixture of manganese dioxide and thallic oxide in the pores of the anode, as indicated at 12a. The resulting concentration of thallic oxide is 1.2% by weight of manganese dioxide. We have found that good results are obtained if the concentration is kept between the limits of 0.3% and 1.5% by weight of thallic oxide. With this concentration the film healing properties of the manganese dioxide are unaltered but its conductivity is considerably increased. After this the processes of impregnation and decomposition are repeated and the anode is then reformed in a solution of 5% boric acid in the usual manner.

The complete cycle of first impregnation and decomposition, second impregnation and decomposition, and reforming is then repeated, and if necessary repeated a second time. Finally, conducting material 13 such as graphite is applied in a known manner (e.g. by immersing the anode in a solution of aquadag) to provide a low resistance cathode connection. A metal cathode coating 14 is then applied to the anode assembly by spraying or melting onto the cylindrical surface, care being taken to insulate the anode lead from the cathode. The assembly is then encased in the housing 15 and connections are made from the anode and cathode in known manner.

Referring to FIG. 1 there are shown two curves of characteristics for two 50 $\mu$f. 8 volt D.C. working solid type tantalum capacitors. Curve 1 is for a capacitor in which the semiconductive oxide is manganese dioxide only, and curve 2 is for a capacitor in which the solid conducting material is a mixture of manganese dioxide plus 1.2% by weight of thallic oxide.

It can be seen that there is an improvement in power factor for the capacitor with thallic oxide of from 55% to 28% at 1 kc./s., and from 90% to 84% at 10 kc./s.

The incorporation of the thallic oxide has been found to have a second advantage. The capacitance of sintered tantalum bodies is known to depend upon the particle size of the tantalum powder used. The finer the particle size the greater the capacitance obtained per unit volume of the sintered body. Experimentally however, it is found that the increased capacitances obtained by this means tend to drop somewhat at the higher frequencies. This drop is reduced by the use of thallic oxide within the limits of the proportions named, and is illustrated in FIG. 2.

Referring to FIG. 2 there are shown two curves of characteristics for two 50 $\mu$f. 8 volt D.C. working solid type tantalum capacitors. Curve 3 is for a capacitor in which the semiconductive oxide is manganese dioxide only, and curve 4 is for a capacitor in which the solid conducting material is a mixture of manganese dioxide plus 1.2% by weight of thallic oxide.

It can be seen that there is a reduction in the fall of capacitance for the capacitor with thallic oxide of from 9% to 2.1% at 1 kc./s., and from 65.3% to 27.3% at 10 kc./s.

It is therefore possible, by the addition of thallic oxide within the preferred range, to make capacitors which have the advantage of a higher capacitance per unit volume, and which lose a smaller proportion of their capacitance at higher frequencies.

Although in the embodiment described the porous body for the anode is of tantalum, it need not be of this particular metal, it could be one of the other film forming metals, such as tungsten, hafnium, niobium, titanium, or zirconium.

Furthermore application of the invention is not limited to capacitors which have anodes of porous sintered metal, the dielectric film may be formed upon a foil or wire which may be used as an anode.

Aluminium may be used for an anode in the shape of a foil or a wire as an alternative to one of the metals mentioned above as a film forming metal.

While the principles of the invention have been described above in connection with specific embodiments, and particular modifications thereof, it is to be clearly understood that this description is made only by way of example and not as a limitation to the scope of the invention.

What I claim is:

1. A solid electrolytic capacitor which includes an anode upon a surface of which there is an anodically formed dielectric film, a semiconductive layer containing manganese dioxide and between .3% and 1.5% by weight of thallic oxide upon the formed film, and an electrically conducting cathode coating upon the said layer.

2. A solid electrolytic capacitor as claimed in claim 1, in which the anode is a porous body composed of sintered metal particles.

3. A solid electrolytic capacitor, as claimed in claim 1, in which the anode is made of a metal selected from the group consisting of tantalum, tungsten, niobium, hafnium, titanium, and zirconium.

4. A solid electrolytic capacitor which includes a porous sintered body of tantalum, a dielectric film produced by anodisation on the surfaces of the body, a semiconductive layer containing manganese dioxide and between .3% and 1.5% by weight of thallic oxide on the dielectric film, and an electrically conducting covering layer on the layer of semiconductive oxide.

References Cited in the file of this patent

UNITED STATES PATENTS

| | | |
|---|---|---|
| 1,238,660 | Field-Frank | Aug. 28, 1917 |
| 1,261,711 | Creighton | Apr. 2, 1918 |
| 1,678,824 | Ruben | July 31, 1928 |
| 1,877,140 | Lilienfeld | Sept. 13, 1932 |
| 1,906,691 | Lilienfeld | May 2, 1933 |
| 1,925,307 | Boer | Sept. 5, 1933 |
| 2,005,279 | Van Geel | June 18, 1935 |
| 2,299,228 | Gray | Oct. 20, 1942 |

FOREIGN PATENTS

| | | |
|---|---|---|
| 26,688 | Great Britain | Dec. 21, 1905 |